(12) United States Patent
Natsume (10) Patent No.: US 8,644,695 B2
(45) Date of Patent: Feb. 4, 2014

(54) LENS SYSTEM AND IMAGE PICKUP SYSTEM INCLUDING THE SAME

(71) Applicant: Canon Kabushiki Kaisha, Tokyo (JP)

(72) Inventor: Satoshi Natsume, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/661,406

(22) Filed: Oct. 26, 2012

(65) Prior Publication Data

US 2013/0121673 A1 May 16, 2013

(30) Foreign Application Priority Data

Nov. 16, 2011 (JP) ................................. 2011-250414

(51) Int. Cl.
*G03B 17/00* (2006.01)
(52) U.S. Cl.
USPC .......................................................... 396/56
(58) Field of Classification Search
USPC .......................................................... 396/56
See application file for complete search history.

(56) References Cited

U.S. PATENT DOCUMENTS

| | | | | |
|---|---|---|---|---|
| 2007/0166027 A1* | 7/2007 | Misawa | .......................... | 396/529 |
| 2010/0002070 A1* | 1/2010 | Ahiska | .............................. | 348/36 |
| 2010/0002071 A1* | 1/2010 | Ahiska | .............................. | 348/36 |
| 2010/0053428 A1* | 3/2010 | Ohe et al. | ....................... | 348/452 |
| 2013/0093853 A1* | 4/2013 | Iwami et al. | ..................... | 348/46 |

FOREIGN PATENT DOCUMENTS

JP 2007293070 A 11/2007

* cited by examiner

*Primary Examiner* — Rodney Fuller
(74) *Attorney, Agent, or Firm* — Rossi, Kimms & McDowell LLP (57) ABSTRACT

A lens system includes an operating unit for operating a lens apparatus, an operation-side communication unit performing bidirectional communication to/from the operating unit via a transmission line, and a lens-side communication unit performing bidirectional communication to/from the lens apparatus via a transmission line. The operation-side and lens-side communication units perform wireless communication to/from each other. The operation-side communication unit includes a command selecting unit selecting a command to be transmitted to the lens-side communication unit from commands input from the operating unit, and an answer interpolating unit generating an interpolated answer by interpolating answers with respect to commands that are not selected. The lens-side communication unit includes an answer selecting unit selecting an answer to be transmitted to the operation-side communication unit from answers input from the lens apparatus, and a command interpolating unit generating a command by interpolating commands received from the operation-side communication unit.

9 Claims, 9 Drawing Sheets

LENS SYSTEM AND IMAGE PICKUP SYSTEM INCLUDING THE SAME

BACKGROUND OF THE INVENTION

1. Field of the Invention

The present invention relates to a lens system, and more particularly, to a lens system in which movable optical members of an optical system in a lens apparatus, such as a focusing member, a zooming member, and a stop, are driven and controlled by an operating unit connected to the lens apparatus as an external apparatus via wireless communication, and an image pickup system including the lens system.

2. Description of the Related Art

A portable electronic news gathering (ENG) camera or a portable camcorder has been known as a television camera for broadcasting or professional use. Sometimes such a television camera is used in a state of being fixed to a mount such as a tripod, a pedestal dolly, or a crane (hereinafter referred to as a "tripod") and other times in a state of being directly carried by a camera operator on a shoulder or in hand. When the television camera is used in the state of being fixed to the tripod, a controller is often used, which is represented by a demand for remote control. For example, a controller such as a focusing demand or a zooming demand is attached to an end portion of a pan/tilt stick extended from the tripod, and the controller is electrically connected to a lens apparatus mounted on a camera main body with a cable. This enables the camera operator to perform an operation of the controller as well as an operation of pan and tilt of the television camera by using the pan/tilt stick, thus performing a lens operation such as focusing and zooming of the optical system in the lens apparatus by the operation of the controller. The lens apparatus and the controller are connected to each other with a multicore cable, and when further connecting multiple command apparatus, it is necessary to provide as many cables as the number of command apparatus. Therefore, in order to remove the burden of connecting, installing, and disconnecting the cables, an apparatus employing a method of electrically connecting the lens apparatus and the controller so that a signal can be transmitted therebetween without using a cable has been proposed.

For example, in Japanese Patent Application Laid-Open No. 2007-293070, an apparatus is disclosed in which a signal conversion unit is connected to each of a lens apparatus and a demand so that a command signal to be transmitted is converted into a signal supported in wireless communication by the signal conversion unit. The apparatus transmits the command signal and operates the lens apparatus via a wireless connection.

In the conventional technology disclosed in Japanese Patent Application Laid-Open No. 2007-293070 described above, the lens apparatus is configured to be operated by connecting a digital-type demand and transmitting and receiving a digital communication command signal.

However, there is no description on communication speeds between the demand and the signal conversion unit and between the signal conversion unit and the lens apparatus and a communication speed of the wireless communication between the signal conversion units.

When the signal conversion unit such as a wireless unit is interposed in a demand serial communication system between the demand and the lens apparatus, a demand communication rate may become larger than a wireless transmission rate depending on a condition. In this case, a communication speed and a communication data amount cannot be maintained as those before the case happened in contrast to the case of a direct wired connection, which may cause a problem of delay or stagnation of a response to a driving operation.

SUMMARY OF THE INVENTION

The present invention provides a lens apparatus capable of maintaining a demand communication rate even when a signal conversion unit such as a wireless unit is interposed between a demand and the lens apparatus and a wireless transmission rate is lower than the demand communication rate.

In order to solve the above-mentioned problem, according to an exemplary embodiment of the present invention, there is provided a lens system, including: a lens apparatus; an operating unit for operating the lens apparatus; an operation-side communication unit connected to the operating unit and configured to perform bidirectional communication to/from the operating unit via a transmission line; and a lens-side communication unit connected to the lens apparatus and configured to perform bidirectional communication to/from the lens apparatus via a transmission line, the operation-side communication unit and the lens-side communication unit performing wireless communication to/from each other, the operation-side communication unit including: a command selecting unit configured to select a command to be transmitted to the lens-side communication unit from commands input from the operating unit; and an answer interpolating unit configured to generate an interpolated answer signal by interpolating answer signals with respect to commands that are not selected by the command selecting unit, the lens-side communication unit including: an answer selecting unit configured to select an answer signal to be transmitted to the operation-side communication unit from answer signals input from the lens apparatus; and a command interpolating unit configured to generate an interpolated command by interpolating commands received from the operation-side communication unit.

According to the present invention, there may be provided a lens apparatus capable of maintaining a demand communication rate even when a signal conversion unit such as a wireless unit is interposed between a demand and the lens apparatus and a wireless transmission rate is lower than the demand communication rate.

Further features of the present invention will become apparent from the following description of exemplary embodiments with reference to the attached drawings.

DESCRIPTION OF THE EMBODIMENTS

Figure 1:
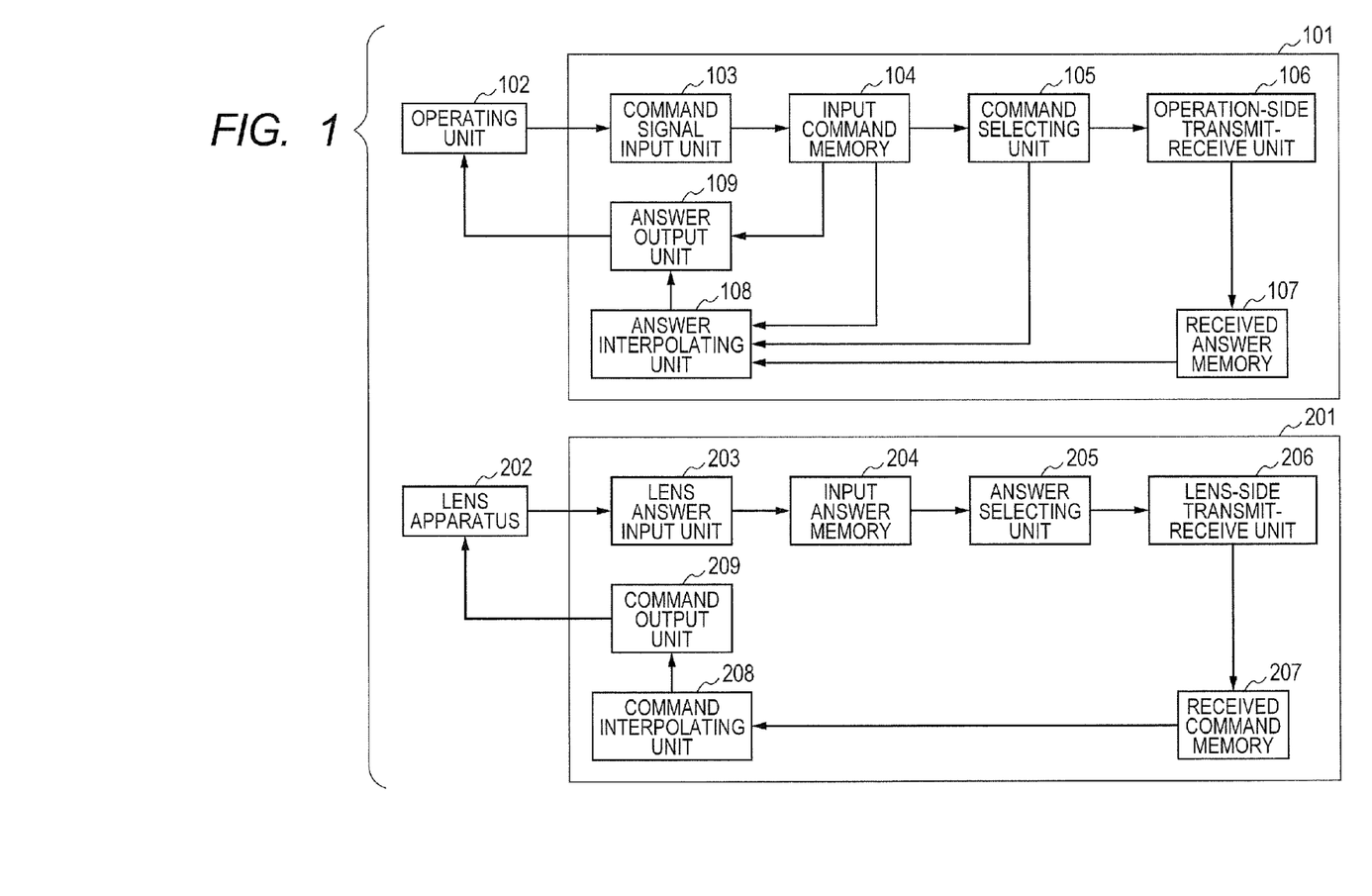
FIG. 1 is a block diagram of a signal conversion unit according to a first embodiment of the present invention.

Exemplary embodiments of the present invention are now described in detail in accordance with the accompanying drawings. FIG. 1 is a block diagram of a signal conversion unit according to an embodiment of the present invention.

(First Embodiment)

A first embodiment of the present invention is described below with reference to FIG. 1 and flowcharts of FIGS. 2 to 7.

A configuration of a lens system according to the present invention is illustrated in FIG. 1. The lens system according to the present invention includes an operating apparatus unit constituted of an operating unit 102 for operating a lens apparatus 202 and an operation-side communication unit 101 connected to the operating unit 102, and a lens apparatus unit constituted of the lens apparatus 202 and a lens-side communication unit 201 connected to the lens apparatus 202.

The operation-side communication unit 101 is electrically connected to the operating unit 102 in a wired manner (connected via a transmission line in manner that bidirectional communication can be performed), and functions as a signal conversion unit for transmitting an operation demand signal generated by an operation on the operating unit 102 to the lens apparatus 202 via wireless communication. The operation-side communication unit 101 performs bidirectional communication of a control signal and an answer signal in a communication method represented by the wireless communication to/from the lens-side communication unit 201 (a signal conversion unit on the other side) that is electrically connected to the lens apparatus 202 in a wired manner (connected via a transmission line in manner that bidirectional communication can be performed).

A command signal output based on an operation of the operating unit 102 (for example, a zoom control signal or a focus control signal) is input to a command signal input unit 103 as a command for lens operation. An input command memory 104 stores therein the command signals input to the command signal input unit 103 as commands in the order of input. A command selecting unit 105 selects a command stored in the input command memory 104 as a signal to be transmitted to the lens-side communication unit 201 that is the signal conversion unit on the other side and a signal not to be transmitted, based on a predetermined standard. An operation-side transmit-receive unit 106 converts the command selected by the command selecting unit 105 as a transmission command into a signal suitable for the lens-side communication unit 201 that is the signal conversion unit on the other side, and transmits the converted signal to the lens-side communication unit 201. The operation-side transmit-receive unit 106 also receives an answer signal transmitted from the lens-side communication unit 201 that is the signal conversion unit on the other side, and transmits the answer signal to an answer memory, which is to be described later. A received answer memory 107 stores therein the answer signal transmitted from the operation-side transmit-receive unit 106.

An answer interpolating unit 108 obtains the answer signal stored in the received answer memory 107, compares the obtained answer signal with the command stored in the input command memory 104, and interpolates a missing part. An answer output unit 109 outputs the answer signal interpolated by the answer interpolating unit 108 to the operating unit 102.

An answer signal (such as a zoom position signal or a focus position signal) output from the lens apparatus 202 is input to a lens answer input unit 203 as an answer signal for the operating unit 102. An input answer memory 204 stores therein the answer signals input to the lens answer input unit 203 in the order of input. An answer selecting unit 205 selects an answer signal stored in the input answer memory 204 as a signal to be transmitted to the operation-side communication unit 101 that is the signal conversion unit on the other side and a signal not to be transmitted, based on the predetermined standard. In order to transmit the answer signal selected in the answer selecting unit 205 as the answer signal to be transmitted to the operation-side communication unit 101 that is the signal conversion unit on the other side, a lens-side transmit-receive unit 206 converts the answer signal into a signal suitable for its transmitting unit and transmits the converted answer signal. The lens-side transmit-receive unit 206 also receives a command transmitted from the operation-side communication unit 101 that is the signal conversion unit on the other side, and transmits the received command to a received command memory, which is to be described later.

A received command memory 207 stores therein a command signal from the lens-side transmit-receive unit 206. A command interpolating unit 208 obtains the command signal stored in the received command memory 207, and interpolates a missing part of the command. A command output unit 209 transmits the command signal interpolated by the command interpolating unit 208 to the lens apparatus 202.

An operation of the lens system according to this embodiment is described below with reference to flowcharts of FIGS. 2 to 9.

In this embodiment, the operating unit 102 and the lens apparatus 202 are connected to the operation-side communication unit 101 and the lens-side communication unit 201, respectively, and after being powered on, the two signal conversion units are ready to make communication to/from each other. When an operation is performed on the operating unit 102, a command signal is output in response to the operation and the command signal is transmitted to the lens apparatus 202 via the operation-side communication unit 101 and the lens-side communication unit 201 to make the lens apparatus 202 operable.

In describing this embodiment, an operation of the lens system according to this embodiment is described in detail by describing operations of the operation-side communication unit 101 and the lens-side communication unit 201.

The operation of the operation-side communication unit 101 is described first with reference to flowcharts of FIGS. 2 to 5.

Figure 2:
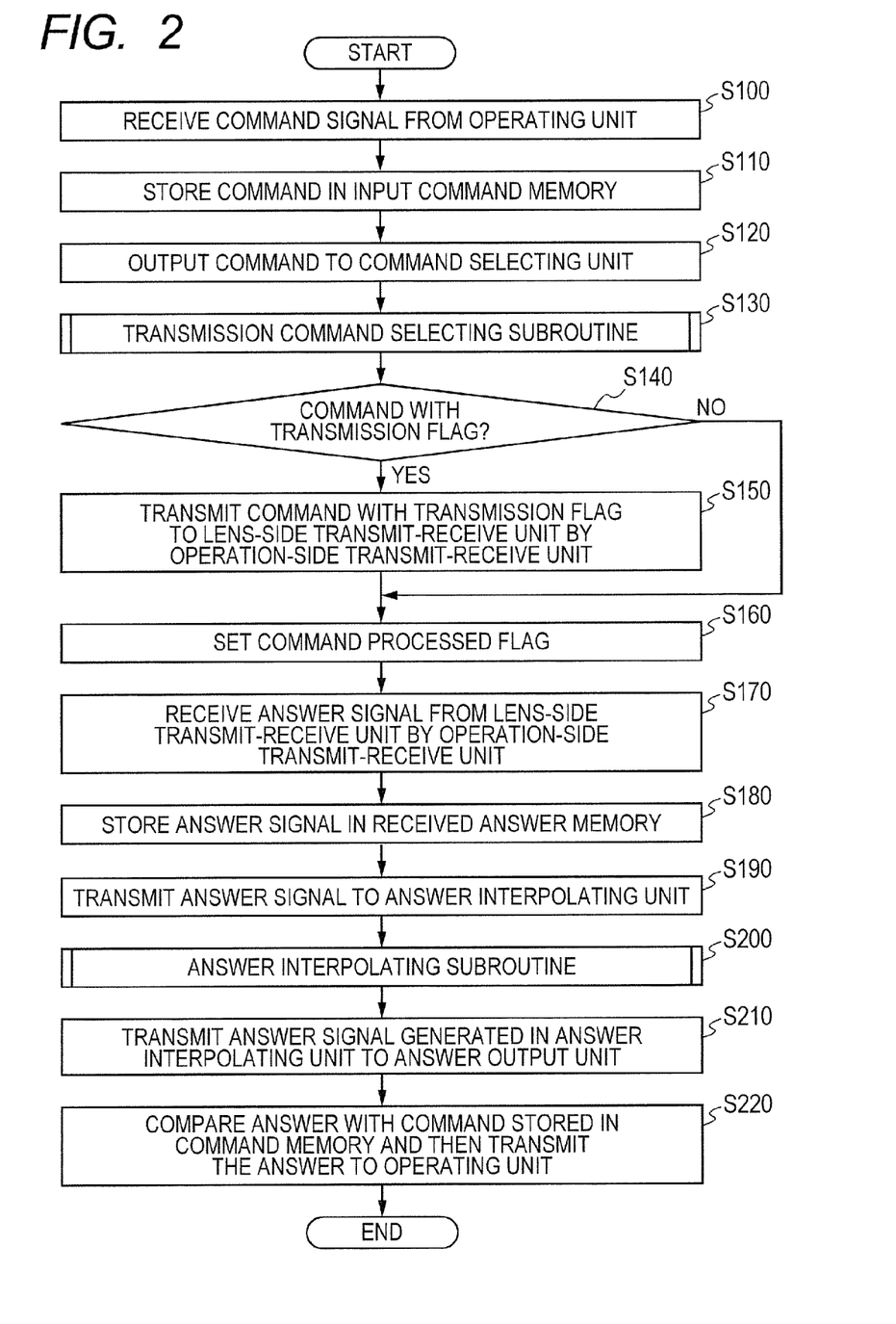
FIG. 2 is a flowchart of a process of an operation-side communication unit according to the first embodiment.

In a state in which the operation-side communication unit 101 and the lens-side communication unit 201 are connected to each other, in Step S100, upon operating the lens apparatus 202, the operating unit 102 is connected to the operation-side communication unit 101. The operating unit 102 can be a zoom demand, a focus demand, or the like which electrically drives a zoom lens and a focus lens of the lens apparatus 202.

When an operation is performed on the operating unit 102, a control signal and a switch ON/OFF signal are output in response to the operation, and the signals output from the operating unit 102 are input to the command signal input unit 103. Upon receiving the command signal, the process proceeds to Step S110 where the command signal input unit 103 transmits the command signal to the input command memory 104 as a command, and the input command memory 104 stores therein the received commands in the order of being transmitted.

In Step S120, the commands stored in the input command memory 104 are output to the command selecting unit 105, and the process proceeds to Step S130. In Step S130, the command selecting unit 105 performs a process of a transmission command selecting subroutine to select a command to transmit to the lens-side communication unit 201.

Figure 3:
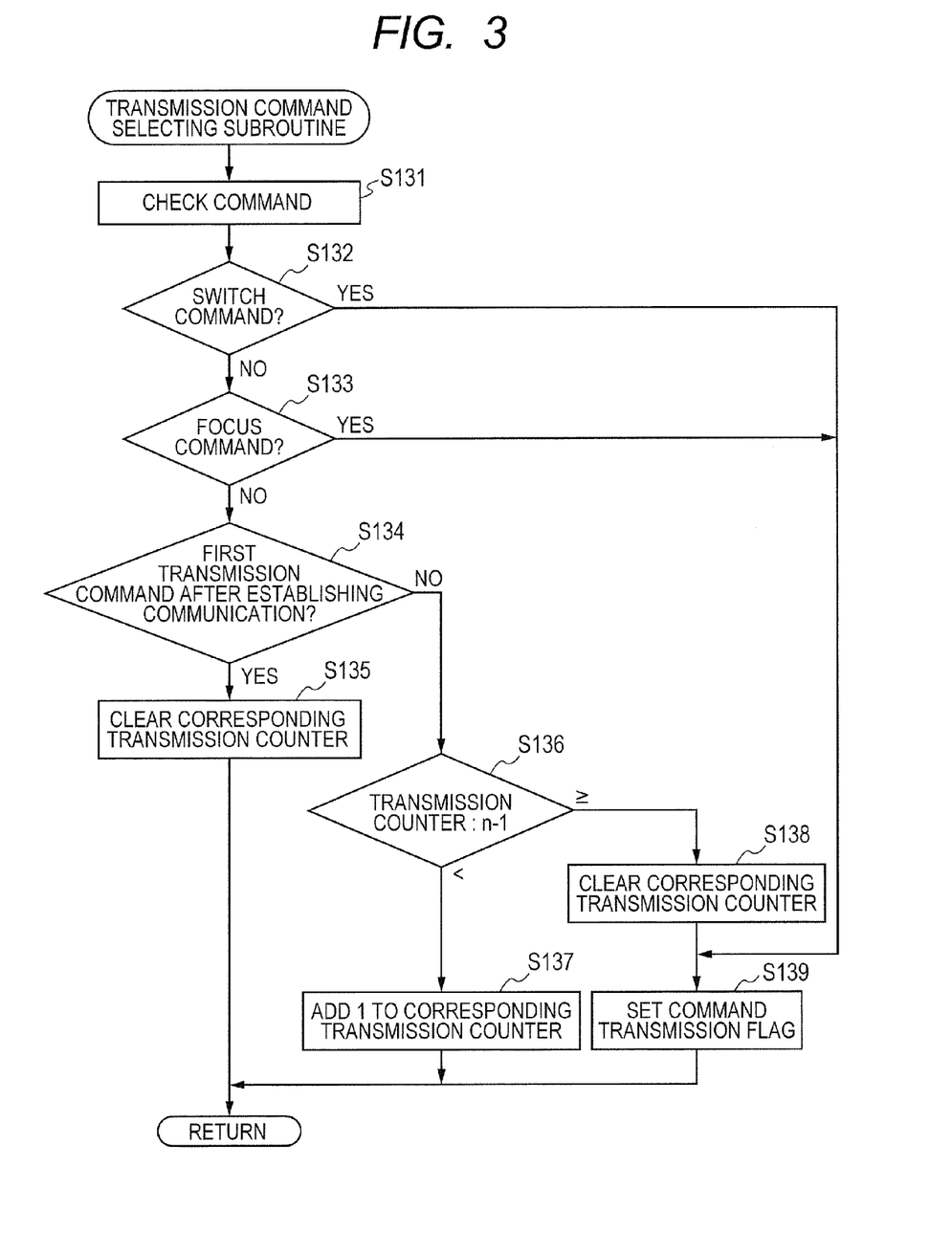
FIG. 3 is a flowchart of a transmission command selecting subroutine of the operation-side communication unit according to the first embodiment.

The process of the transmission command selecting subroutine (Step S130) is described in detail with reference to the flowchart of FIG. 3.

In the transmission command selecting subroutine, a command to be transmitted to the lens-side communication unit 201 and a command not to be transmitted are selected.

In this embodiment, among the commands input from the operating unit 102, a part of the commands is selected and only the selected commands are transmitted for an iris command and a zoom command, and all the commands are transmitted for a focus command and other switch commands. Further, in this embodiment, the zoom command is a command for instructing a speed, and the focus command and the iris command are commands for instructing a position. The description of FIG. 3 is continued below.

In Step S131, the received command is checked. The command transmitted from the operating unit 102 includes a control command for the iris, the zoom lens, and the focus lens for driving the lens and a switch command for switching ON and OFF various functions of the lens apparatus.

In Step S132, it is first determined whether or not the command input from the operating unit 102 is a switch command. When it is determined that the command is a switch command, the process skips to Step S139, and when it is determined that the command is not the switch command, i.e., when it is determined that the command is a control command, the process proceeds to S133. In Step S133, it is determined whether or not the control command is a focus command. When it is determined that the command is a focus command, the process skips to Step S139, and when it is determined that the command is not the focus command, i.e., when it is determined that the command is a zoom command or an iris command, the process proceeds to Step S134. In this manner, regarding the focus command and the switch command that require a quick response to adjust the focus, all commands are transmitted without being thinned, thus maintaining the responsiveness.

In Step S134, it is determined whether or not the command is the iris command or the zoom command that is first input after establishing communication between the operation-side communication unit 101 and the lens-side communication unit 201. When it is determined that the command is the first command input after establishing the communication, the process proceeds to Step S135 to clear a transmission counter to "0". When it is determined that the command is not the first command in Step S134, the process proceeds to Step S136 to check a value of the transmission counter, and when the value is smaller than a preset value: n−1, the process proceeds to Step S137 to add "1" to the transmission counter. When the value of the transmission counter is equal to or larger than n−1 in Step S136, the process proceeds to Step S138 to clear the transmission counter to "0", and then the process proceeds to Step S139 to set a transmission flag to the received command.

In this subroutine, a counter corresponding to each command is set, the counter value of each command is checked, a necessity of transmission to the lens-side communication unit 201 side is determined based on the counter value, and when transmitting the command, the transmission flag is set to data of the command.

In this manner, regarding the zoom command instructing a speed and the iris command instructing a position that relatively do not require a quick response, the commands to be transmitted are thinned such that only a part of the commands is to be transmitted, by which demand communication can be maintained even when using wireless communication having a low transmission rate. The subroutine S130 is thus completed, and the process proceeds to Step S140.

In Step S140, it is determined whether or not each of the commands stored in the input command memory 104 is a command with the transmission flag set in the transmission command selecting subroutine in the order of being stored. When it is determined that the command is a command with the transmission flag set, the process proceeds to Step S150 to transmit the command to the lens-side communication unit 201 via the operation-side transmit-receive unit 106. The process then proceeds to Step S160. On the other hand, when it is determined that the command is a command without the transmission flag set, the process proceeds to Step S160. In Step S160, a processed flag is set to the command.

The next process is a process performed when an answer signal is transmitted from the lens-side communication unit 201. In Step S170, the answer signal is received from the lens-side communication unit 201 via the operation-side transmit-receive unit 106. In Step S180, the received answer signal is stored in the received answer memory 107. In Step S190, the answer signal stored in the received answer memory 107 is transmitted to the answer interpolating unit 108.

Figure 4:
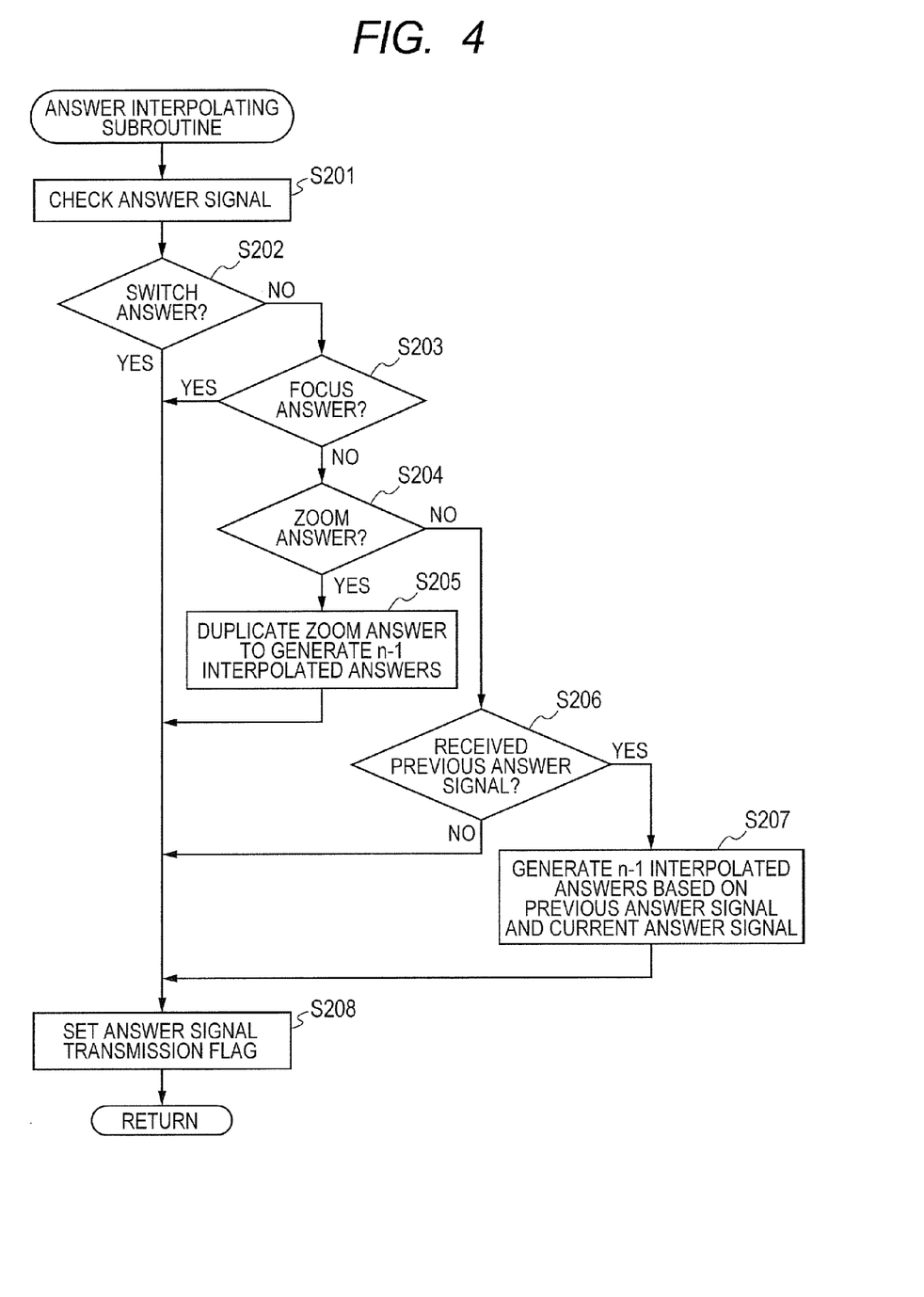
FIG. 4 is a flowchart of an answer signal interpolating subroutine of the operation-side communication unit according to the first embodiment.

The answer interpolating unit 108 performs an answer interpolating subroutine of Step S200 to interpolate an answer signal to be returned to the operating unit 102.

An operation of the answer interpolating subroutine (Step S200) is described next with reference to the flowchart of FIG. 4.

In Step S201, the received answer signal is first checked. Normally, the answer signal transmitted from the lens-side communication unit 201 to the operation-side communication unit 101 includes position answer signals for an iris unit (not shown), a zoom unit (not shown), and a focus unit (not shown), a switch answer signal for replying whether or not switching ON or OFF of various functions of the lens apparatus 202 has been performed, and the like. These answer signals are control answer signals with respect to the iris command, the zoom command, and the focus command, and hence answer signals corresponding to the number of commands transmitted from the operation-side communication unit 101 to the lens-side communication unit 201 are replied.

In Step S202, it is determined whether or not the replied answer signal is a switch answer signal. When it is determined that the answer signal is a switch answer signal, the process skips to Step S208, and when it is determined that the answer signal is not a switch answer signal in Step S202, i.e., when it is determined that the answer signal is a control answer signal, the process proceeds to Step S203. In Step S203, it is determined whether or not the answer signal is a focus answer signal. When it is determined that the answer signal is a focus answer signal, the process skips to Step S208, and when it is determined that the answer signal is not a focus answer signal, i.e., when it is determined that the answer signal is a zoom answer signal or an iris answer signal, the process proceeds to Step S204.

In this manner, regarding the focus answer signals or the switch answer signals with respect to the focus commands or the switch commands that are not to be thinned, the received answer signals which are not the signals subjected to the thinning are transmitted as they are to the operating unit 102.

In Step S204, when it is determined that the received answer signal is a zoom answer signal, the zoom answer signal is duplicated and n−1 interpolated answer signals are generated in Step S205, and the process skips to Step S208.

Only one zoom command is transmitted from the operation-side communication unit 101 to the lens-side communication unit 201 with respect to n corresponding commands from the operating unit 102, and hence only the answer signal for the transmitted command is transmitted from the lens-side communication unit 201 to the operation-side communication unit 101. Therefore, the lens-side communication unit 201 must interpolate the answer signal that is insufficient for the number of operation commands input from the operating unit 102 and output the interpolated answer signal to the operating unit 102. For this reason, the lens-side communication unit 201 generates n−1 interpolated answer signals until the next answer signal is received.

On the other hand, when the answer signal received in Step S204 is not a zoom answer signal, i.e., when the received answer signal is an iris answer signal, the process proceeds to Step S206 to determine whether or not the iris answer signal has been received so far. When it is determined that the iris answer signal has not been received so far, the process skips to Step S208, and when it is determined that the iris answer signal has been received, the process proceeds to Step S207. In Step S207, n−1 answer signals for the thinned n−1 control commands are generated by using the previous answer signal and the currently received answer signal as interpolation data. In this embodiment, the answer signals with respect to the thinned commands are interpolated from the two consecutive answer signals (the currently received answer signal and the previously received answer signal). Specifically, data for the answer signals is generated by equally dividing the values of the two consecutive answer signals by a linear approximation. When the generation of the answer signals by the linear approximation is completed, the process proceeds to Step S208 to set the transmission flag to the answer signal. However, the transmission flag set to the answer signal received from the lens-side communication unit 201 and the transmission flag set to the answer signal generated for the interpolation by the answer interpolating unit 108 are distinguishable from each other.

With the above processes, the answer interpolating subroutine is completed, and the process proceeds to Step S210.

In Step S210, the answer signal generated in the answer interpolating subroutine by the answer interpolating unit 108 is transmitted to an answer output unit. The process then proceeds to Step S220 to compare the answer signal with the control commands for the iris, the zoom lens, and the focus lens stored in the input command memory 104, and after that, the answer signal is output to the operating unit 102. In order to compare the answer signal with the control commands, a transmission flag is first set to a command to be transmitted to the lens-side communication unit 201 in the transmission command selecting subroutine. The command with the transmission flag set is then transmitted to the lens-side communication unit 201, and an answer signal corresponding to the command is transmitted from the lens-side communication unit 201. The answer signal is set with a flag as well in the answer interpolating subroutine, the control command input from the operating unit 102 and the answer signal received from the lens-side communication unit 201 corresponding to the control command are compared with each other by checking the flag, and the answer signal is output to the operating unit 102 with the interpolation data.

With the above processes, the flow of operation of the operation-side communication unit 101 is completed.

Figure 5:
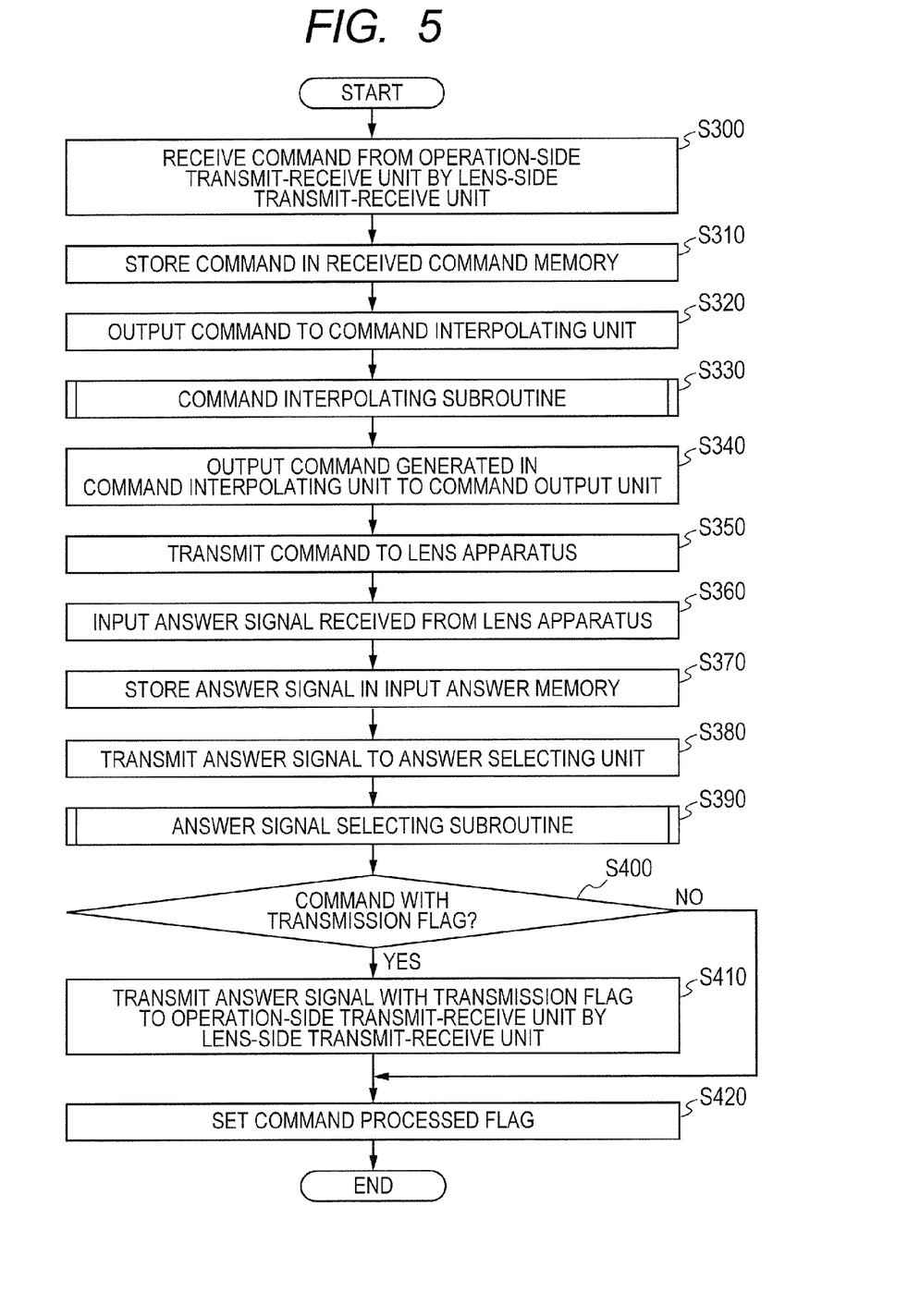
FIG. 5 is a flowchart of a process of a lens-side communication unit according to the first embodiment.
Figure 6:
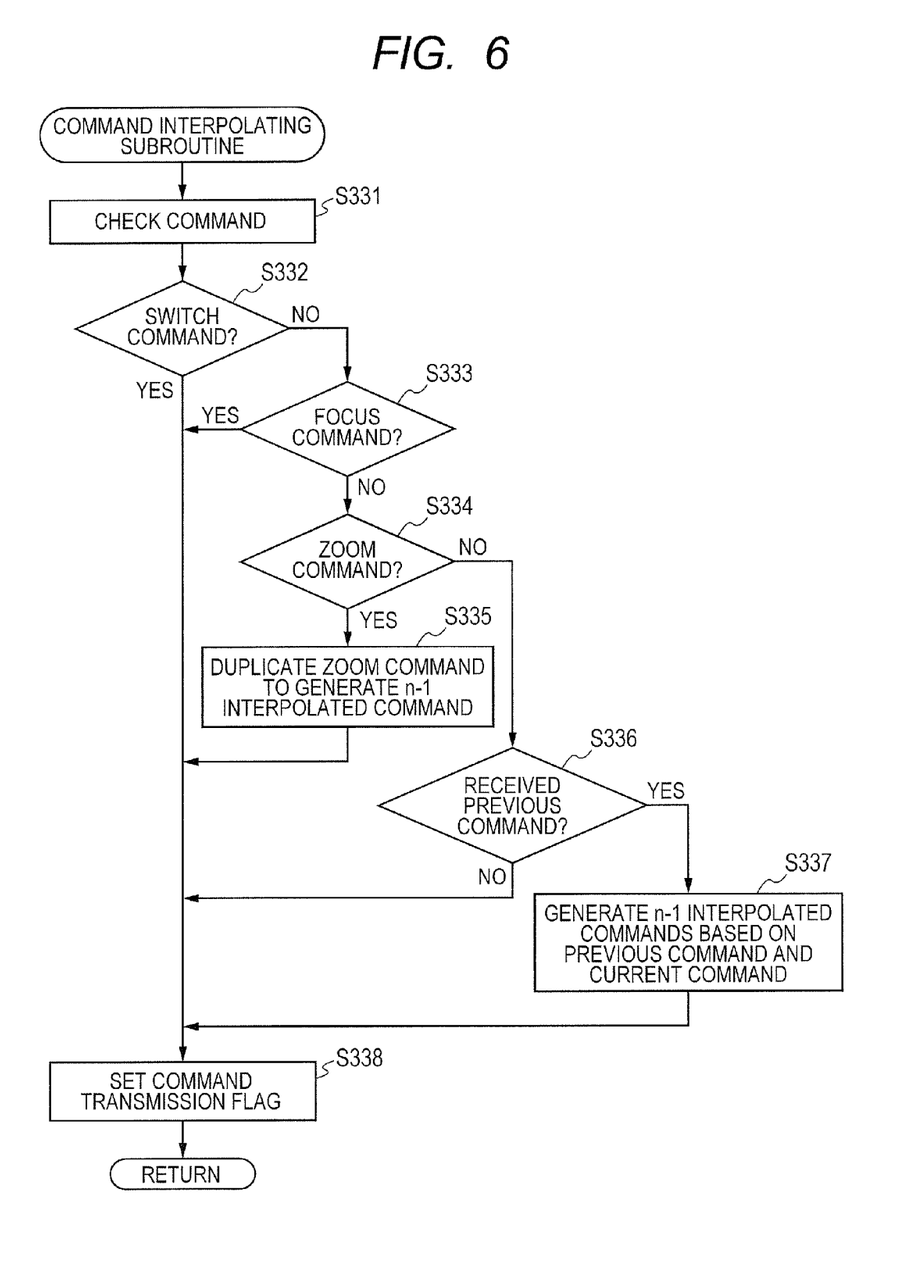
FIG. 6 is a flowchart of a command interpolating subroutine of the lens-side communication unit according to the first embodiment.
Figure 7:
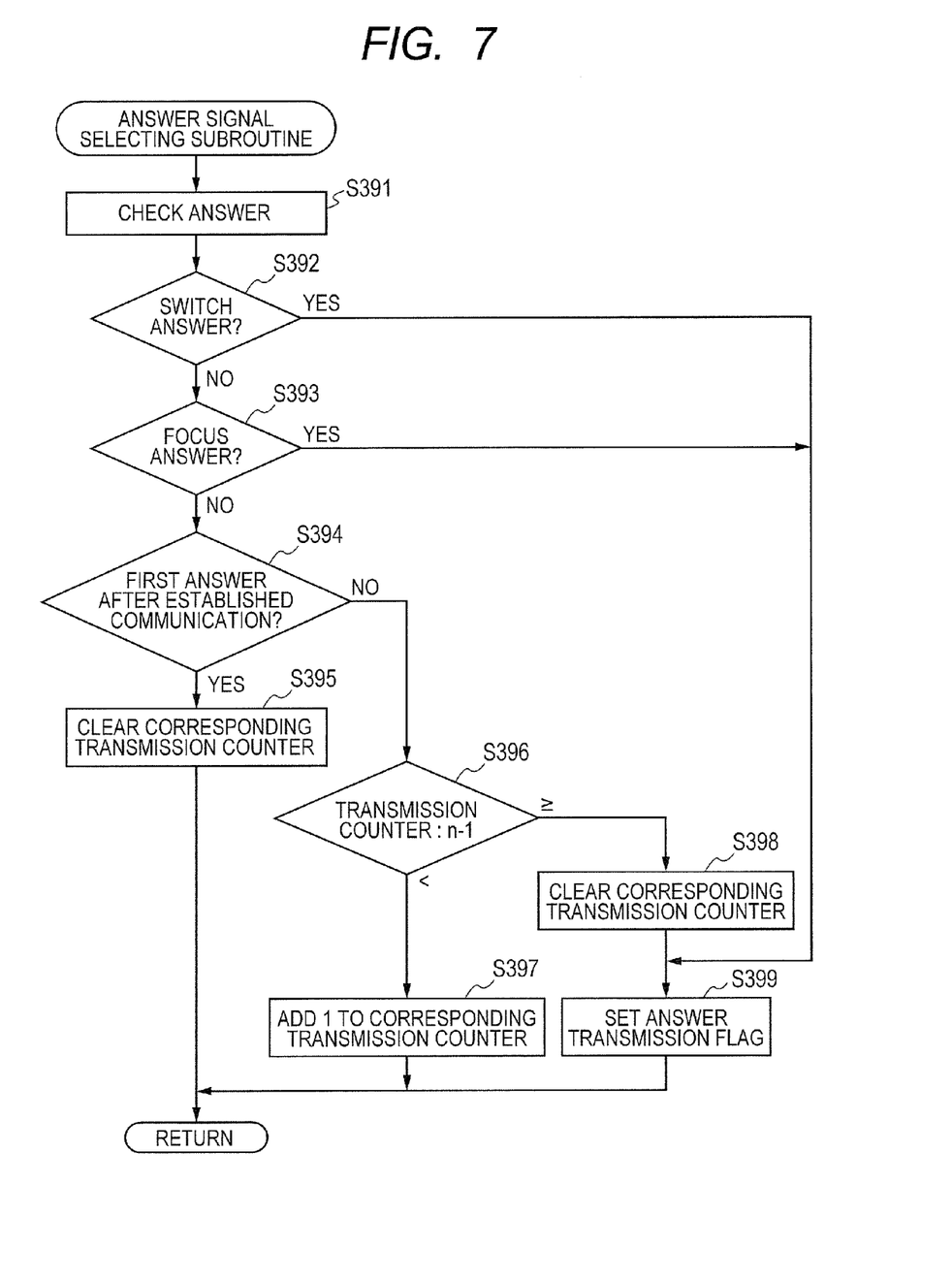
FIG. 7 is a flowchart of an answer signal selecting subroutine of the lens-side communication unit according to the first embodiment.

Subsequently, the operation of the lens-side communication unit 201 is described in detail with reference to FIG. 1 and the flowcharts of FIGS. 5 to 7.

In the state in which the operation-side communication unit 101 connected to the operating unit 102 and the lens-side communication unit 201 connected to the lens apparatus 202 are connected to each other by wireless communication, the lens apparatus 202 is operated by an operation of the operating unit 102. The operating unit 102, such as the zoom demand and the focus demand, electrically drives a zoom lens and a focus lens of the lens apparatus. When the operating unit 102 is operated, the control signal or the switch ON/OFF signal is output in response to the operation, and the operation-side communication unit 101 receives the signal. Upon receiving the command signal, the operation-side communication unit 101 selects the signal as a signal to be transmitted to the lens-side communication unit 201 as described above, converts the selected signal into a signal suitable for the transmit-receive unit, and transmits the converted signal by the wireless communication. The lens-side communication unit 201 receives the transmitted signal by the lens-side transmit-receive unit 206 (Step S300).

When the command is received, the process proceeds to Step S310 to store the command in the received command memory 207 in the lens-side communication unit 201.

The process then proceeds to Step S320 to transmit the commands stored in the received command memory 207 to the command interpolating unit 208 in a sequential manner. The command interpolating unit 208 performs a process of a command interpolating subroutine of Step S330 to interpolate the command to be output to the lens apparatus 202.

Only one command signal is transmitted from the operation-side communication unit 101 with respect to n commands from the operating unit 102 in this embodiment, and hence a process is performed for interpolating command signals that are not transmitted and transmitting the interpolated command signal to the lens apparatus 202 as command data having the same time interval.

An operation of the command interpolating subroutine is described with reference to the flowchart of FIG. 6. In the command interpolating subroutine, the received command is interpolated based on a predetermined rule to generate a command to be transmitted to the lens apparatus 202.

First, in Step S331, the received command is checked. Normally, the command transmitted from the operation-side communication unit 101 includes control commands for an iris unit (not shown), a zoom unit (not shown), and a focus unit (not shown), switch commands for switching ON or OFF various functions of the lens apparatus 202, and the like.

In Step S332, it is determined whether or not the received command is a switch command. When it is determined that the command is a switch command, the process skips to Step S338, and when it is determined that the command is not a switch command in Step S332, i.e., when it is determined that the command is a control command, the process proceeds to Step S333. In Step S333, it is determined whether or not the command is a focus command. When it is determined that the command is a focus command, the process skips to Step S338, and when it is determined that the command is not a focus command, i.e., when it is determined that the command is a zoom command or an iris command, the process proceeds to S334.

In this manner, regarding the focus commands and the switch commands that are not thinned, the received commands are transmitted as they are to the lens apparatus 202 without being interpolated.

In Step S334, when it is determined that the received command is a zoom command, the zoom command is duplicated and n−1 interpolated commands are generated in Step S335, and the process skips to Step S338.

One zoom command is transmitted from the operation-side communication unit 101 side for every n zoom commands. Therefore, the lens-side communication unit 201 must interpolate the insufficient commands to be transmitted to the lens apparatus 202. Therefore, in this example, n−1 interpolated commands are generated until the next command is received.

On the other hand, when it is determined that the command received in Step S334 is not a zoom command, i.e., when it is determined that the command is an iris command, the process proceeds to Step S336 to determine whether or not the iris command has been received so far. When it is determined that the iris command has not been received so far, the process skips to Step S338, and when it is determined that the iris command has been received, the process proceeds to Step S337. In Step S337, interpolation data of n−1 interpolated commands is generated by using the currently received command and the previously received command. In this embodiment, the thinned commands are interpolated by using the two consecutive commands (the currently received control command and the previously received control command). Specifically, data for the commands are generated by equally dividing the values of the two consecutive commands by a linear approximation. When the generation of the data for the commands by the linear approximation is completed, the process proceeds to Step S338 to set a transmission flag to the command. However, the transmission flag set to the command transmitted from the operation-side communication unit 101 and the transmission flag set to the command generated for the interpolation are distinguishable from each other. With the above processes, the subroutine S330 is completed, and the process proceeds to Step S340.

In Step S340, the commands generated by the command interpolating unit 208 are output to the command output unit 209 in the order of being stored. The process then proceeds to Step S350 to output the commands to the lens apparatus 202 according to a communication condition with respect to the lens apparatus 202. The lens apparatus 202 performs a process of driving and switching ON or OFF the zoom lens, the focus lens, and the iris in response to the input command, and when the process is completed, outputs an answer signal corresponding to the received command to the lens answer input unit 203.

Subsequently, the process proceeds to a process performed when the answer signal is input from the lens apparatus 202 to the lens-side communication unit 201. In Step S360, the lens-side communication unit 201 receives the answer signal from the lens apparatus 202 via the lens answer input unit 203. The process then proceeds to Step S370 to store the received answer signal in the input answer memory 204. The process then proceeds to Step S380 to output the answer signals stored in the input answer memory 204 to the answer selecting unit 205.

The answer selecting unit 205 performs an answer signal selecting subroutine of Step S390 to select an answer signal to be returned to the operation-side communication unit 101.

An operation of the answer signal selecting subroutine (Step S390) is described with reference to the flowchart of FIG. 7.

In the answer signal selecting subroutine, an answer signal to be replied to the operation-side communication unit 101 and an answer signal not to be replied are selected.

In this embodiment, the iris answer signal and the zoom answer signal received from the lens apparatus 202 are selected and transmitted, and the focus answer signal and other switch answer signals are all transmitted.

First, in Step S391, the answer selecting unit 205 checks the received answer signal. In Step S392, it is determined whether or not the received answer signal is a switch answer signal. When it is determined that the answer signal is a switch answer signal, the process skips to Step S399, and when it is determined that the answer signal is not a switch answer signal, i.e., when it is determined that the answer signal is a control answer signal, the process proceeds to Step S393. In Step S393, it is determined whether or not the control answer signal is a focus answer signal. When it is determined that the control answer signal is a focus answer signal, the process skips to Step S399, and when it is determined that the control answer signal is not a focus answer signal, i.e., when it is determined that the control answer signal is a zoom answer signal or an iris answer signal, the process proceeds to Step S394. In this manner, regarding the focus answer signal and the switch answer signal that require a quick response to adjust the focus, all the answer signals are transmitted without being thinned, thus maintaining the responsiveness.

In Step S394, it is determined whether or not the answer signal is the iris answer signal or the zoom answer signal that is first input after establishing communication between the operation-side communication unit 101 and the lens-side communication unit 201. When it is determined that the answer signal is the first answer signal, the process proceeds to Step S395 to clear the transmission counter to "0". When it is determined that the answer signal is not the first answer signal in Step S394, the process proceeds to Step S396 to check the value of the transmission counter, and when the value of the transmission counter is smaller than a preset value: n−1, "1" is added to the transmission counter in Step S397. When the value of the transmission counter is equal to or larger than n−1 in Step S396, the process proceeds to Step S398 to clear the transmission counter to "0", and the transmission flag is set to the received answer signal in Step S399.

In this subroutine, a counter corresponding to each command is set, the counter value of each command is checked, and a transmission flag that serves as a reference to determine whether to transmit to the operation-side communication unit 101 side is set.

The zoom answer signal instructing a speed and the iris answer signal instructing a position do not require relatively a quick response. Therefore, by thinning the zoom answer signals and the iris answer signals to be transmitted in the manner described above, demand communication can be maintained even when using wireless communication having a low transmission rate.

With the above processes, the subroutine S390 is completed, and the process proceeds to Step S400.

In Step S400, it is determined whether or not each of the answer signals stored in the input answer memory 204 is an answer signal with the transmission flag set in the order of being stored in the answer selecting subroutine. When it is determined that the answer signal is an answer signal with the transmission flag set, the process proceeds to Step S410 to transmit the answer signal to the operation-side communication unit 101 via the lens-side transmit-receive unit 206. The process then proceeds to Step S420, and after completing the transmission, a processed flag is set to the answer signal, by which the process is completed. On the other hand, when it is determined that the answer signal is an answer signal without the transmission flag set in Step S400, the process proceeds to Step S420 to set the processed flag to the answer signal, by which the process is completed.

In this embodiment, regarding the transmission and the reception of the commands between the operation-side communication unit 101 and the lens-side communication unit 201, the commands are transmitted sequentially in the order of being stored in the input command memory 104. However, the commands may be transmitted from a command that requires a quick response in the operation of the operating unit 102. Normally, the operations of switching ON or OFF and focusing are the operations that require a quick response, and hence the responsiveness can be improved by transmitting the switch ON/OFF command and the focus control command with priority.

In this embodiment, a description is not made separately depending on the number of connected operating units. However, it may be configured such that all commands (data) are transmitted so long as the wireless transmission rate between the apparatus is enough for transmitting and receiving all commands in the case where there is one operating unit, and the thinning processing and interpolating processing may be performed in the case where there are multiple operating units and the wireless transmission rate between the apparatus is not enough for transmitting and receiving all commands.

According to the present invention, by interposing a signal conversion unit in serial communication between a demand and a lens apparatus, there may be provided a lens system that maintains a demand communication rate can be provided even when the communication rate is lower than the demand communication rate. In addition, with the lens system according to the present invention, an image pickup system having an enhanced operability can be achieved.

(Second Embodiment)

The first embodiment has a configuration in which the answer signal is transmitted from the lens-side communication unit 201 to the operating unit 102 after establishing the transmission and the reception of the command and the answer signal between the operation-side communication unit 101 and the lens-side communication unit 201.

However, when the communication rate of the transmission and the reception between the operation-side communication unit 101 and the lens-side communication unit 201 is low, a delay may occur in the transmission of the answer signal to the operating unit 102. Therefore, in a second embodiment of the present invention, a transmission and reception method without causing such a delay is provided.

A lens system according to the second embodiment is described with reference to FIGS. 1 and 10 and flowcharts of FIGS. 8 and 9.

The configuration of the apparatus according to this embodiment is embodied with reference to FIG. 1 and is overlapped with that of the first embodiment, and therefore a description thereof is omitted.

A process flow of communication between the operation-side communication unit 101 and the lens-side communication unit 201 according to this embodiment is described with reference to flowcharts of FIGS. 8 and 9. The operation of the lens-side communication unit 201 is the same as that of the first embodiment, and therefore a description thereof is omitted.

The answer signal also includes a command signal such as a switch ON/OFF command signal other than the answer signal with respect to the control command for the zoom lens, focus lens, and iris, but in this embodiment, the answer signal with respect to the control command for the zoom lens, focus lens, and iris is described as a representative command signal.

Figure 8:
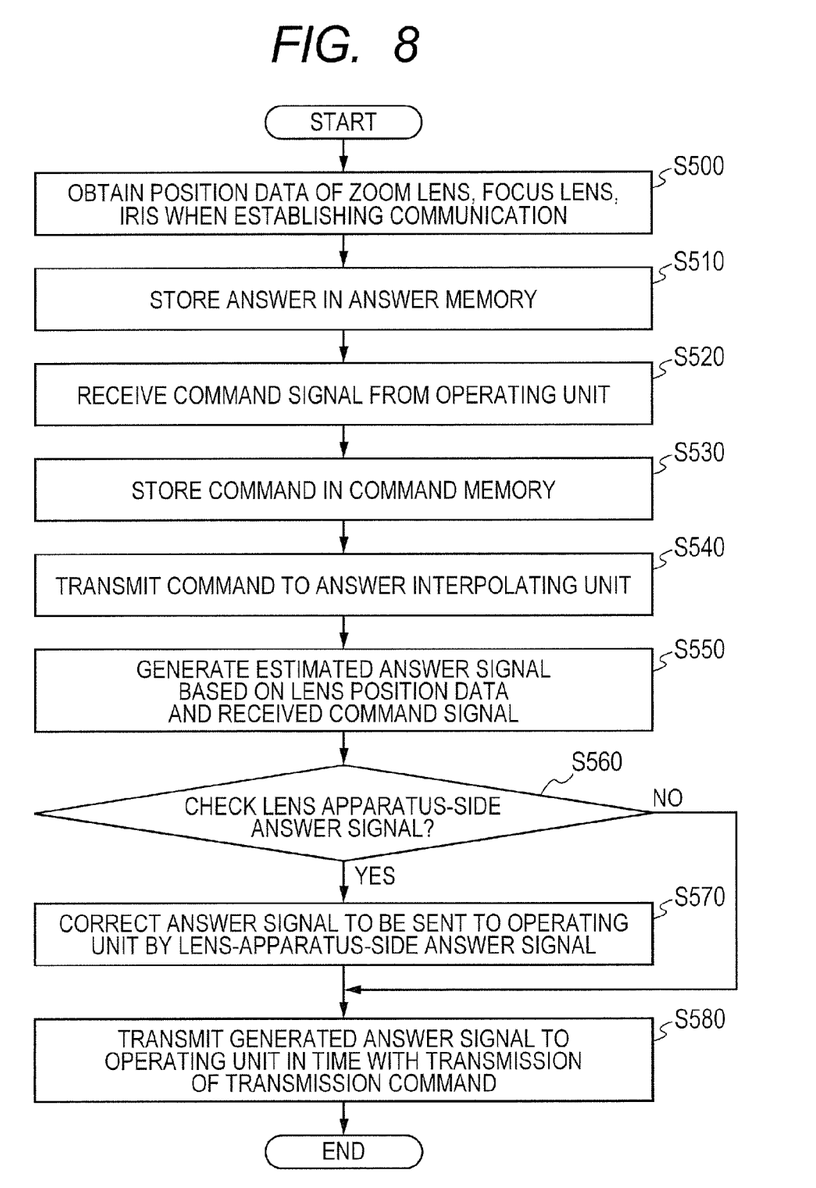
FIG. 8 is a flowchart of a process of an operation-side communication unit according to a second embodiment of the present invention.
Figure 9:
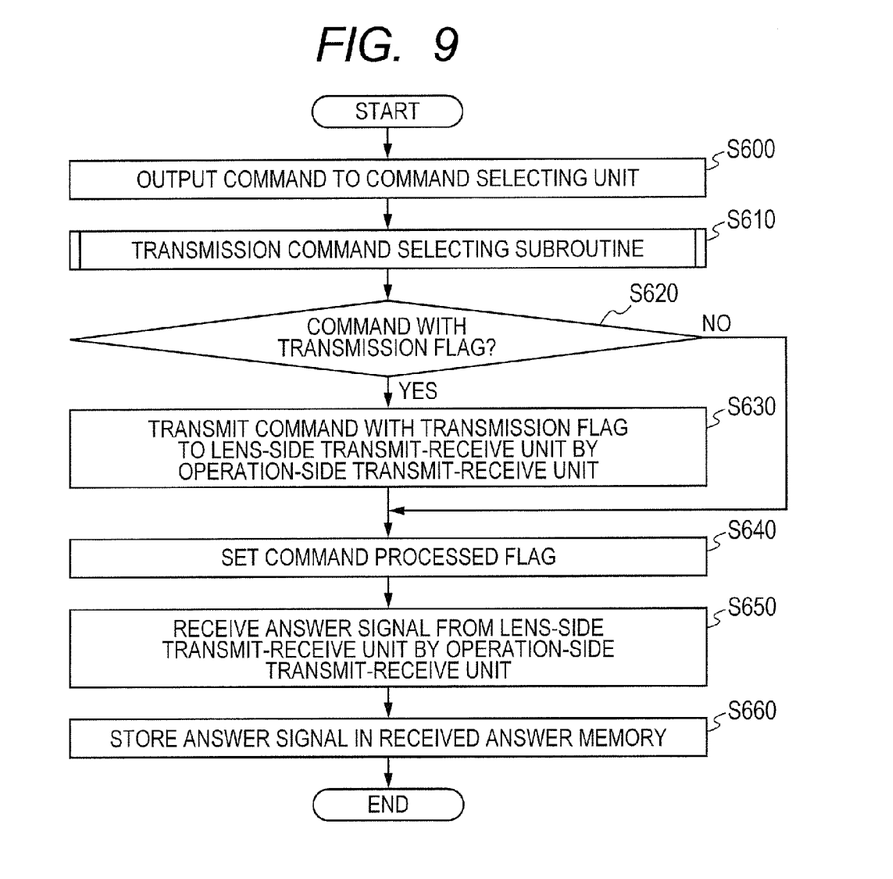
FIG. 9 is a flowchart of the process of the operation-side communication unit according to the second embodiment.

In the flowchart of FIG. 8, after establishing wireless communication between the operation-side communication unit 101 connected to the operating unit 102 and the lens-side communication unit 201 connected to the lens apparatus 202, a command for obtaining the current position of the lens apparatus is transmitted from the operation-side communication unit 101 to the lens-side communication unit 201 to obtain position information of the zoom lens, focus lens, and iris of the lens apparatus 202 via the operation-side transmit-receive unit 106 (Step S500).

In Step S510, the answer signal that is the obtained position information is stored in the received answer memory 107.

In Step S520, when the operating unit 102 is operated, a control signal and a switch ON/OFF command signal are output in response to the operation, and the command signal is received by the command signal input unit 103. When the command signal is received, the process proceeds to Step S530 where the command signal input unit 103 transmits the received command signal to the input command memory 104 as a command, and the input command memory 104 stores therein the received commands in the order of being received. The process then proceeds to Step S540 where the input command memory 104 transmits the command (received command signal) to the answer interpolating unit 108. On the other hand, the input command memory 104 transmits the command to the command selecting unit 105 as well to perform a transmission and reception process to/from the lens-side communication unit 201. The process is described with reference to the flowchart of FIG. 9.

In Step S550, the answer interpolating unit 108 generates an estimated answer signal to be replied to the operating unit 102 based on the command transmitted from the input command memory 104 and the answer signal of the lens position information obtained from the lens-side communication unit 201 when establishing the communication and stored in the received answer memory 107.

Figure 10:
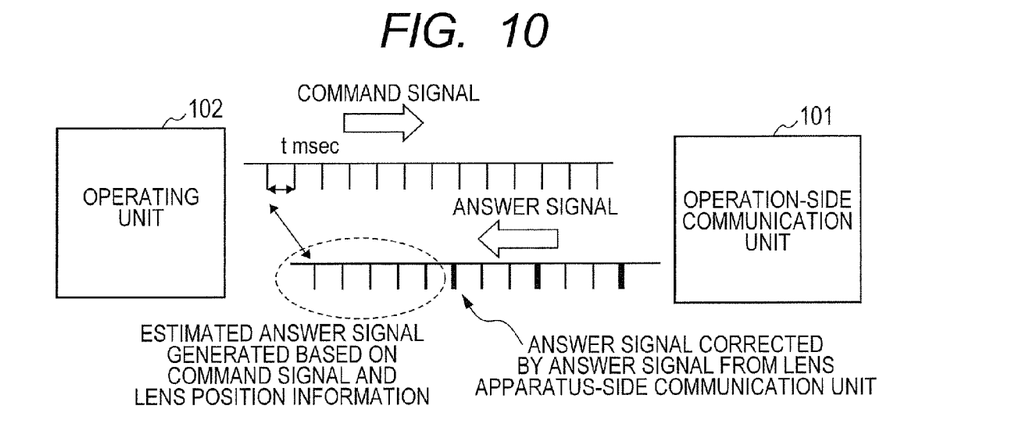
FIG. 10 is an explanatory diagram on transmitting and receiving a command signal and an answer signal between an operating unit and the operation-side communication unit.

That is, the answer interpolating unit 108 estimates a lens position based on the command signal (data and change amount) received from the operating unit 102, the lens position data that are previously stored, and an elapsed time from the reception (transmission from the operating unit 102 side) of the command signal, and generates the estimated answer signal to be transmitted as a preceding reply to the operating unit 102 (see FIG. 10).

As illustrated in FIG. 10, the operating unit 102 outputs the command signal to the operation-side communication unit 101 every t milliseconds, and the operation-side communication unit 101 receives the command signal. The answer signal cannot be transmitted as a reply to the operation-side communication unit 101 until the answer signal is replied from the lens-side communication unit 201 after the command is transmitted to the lens-side communication unit 201, and hence by estimating and generating the answer signal in the manner described above, the reply can be performed without delay.

In Step S560, it is checked whether or not a lens-side answer signal received from the lens side communication unit 201 is stored in the received answer memory 107. When the lens-side answer signal is stored in the received answer memory 107, the process proceeds to Step S570 where the estimated answer signal which has been estimated and generated is corrected by using the lens-side answer signal in order to send the answer signal to the operating unit 102. However, this lens-side answer signal is an answer signal which corresponds to a command to which a reply has already been transmitted as an answer signal to the operating unit 102, and hence a necessity of correcting the answer signal to be replied to the operating unit 102 is determined based on: the command signal from the operating unit 102; the elapsed time from a reception of the command signal by the command signal input unit 103 from the operating unit 102; the elapsed time from a transmission of the command from the operation-side communication unit 101 to the lens-side communication unit 201 to a reply of the answer signal from the lens apparatus; the stored lens position data (for example, the positions of the zoom lens, the focus lens, and the iris); and the lens-side answer signal, and the correction is performed as needed.

When it is determined that the lens-side answer signal received from the lens-side communication unit 201 is not stored in the received answer memory 107 in Step S560, the process proceeds to Step S580.

In Step S580, the estimated answer signal which has been generated or the corrected answer signal is transmitted to the operating unit 102 in time with the transmission of the transmission command.

While generating the answer signal to the operating unit, it is necessary to perform a command transmitting process to the lens-side communication unit 201 in parallel. The process is described with reference to the flowchart of FIG. 9.

It is assumed that the command from the operating unit 102 is already stored in the input command memory 104 in the flowchart of FIG. 8.

In Step S600, the commands stored in the input command memory 104 are transmitted to the command selecting unit 105. The command selecting unit 105 performs a process of a transmission command selecting subroutine in Step S610, selecting a command to be transmitted to the lens-side communication unit 201. The transmission command selecting subroutine in Step S610 is the same as the subroutine described in the first embodiment, and therefore a description thereof is omitted. When the subroutine S610 is completed, the process proceeds to Step S620.

In Step S620, it is checked whether or not each of the commands stored in the input command memory 104 is a command with the transmission flag set in the order of being stored in the transmission command selecting subroutine, and when it is determined that the command is a command with the transmission flag set, the process proceeds to Step S630 to transmit the command to the lens-side communication unit 201 via the operation-side transmit-receive unit 106. The process then proceeds to Step S640 where after completing the transmission of the command, a processed flag is set to the command. On the other hand, when it is determined that the command is a command without the transmission flag set in Step S620, the process proceeds to Step S640 to set the processed flag to the command.

Subsequently, the process proceeds to a process to be performed when the answer signal is transmitted from the lens-side communication unit 201. In Step S650, the answer signal is received from the lens-side communication unit 201 via the operation-side transmit-receive unit 106. The process then proceeds to Step S660 to store the received answer signal in the received answer memory 107.

With the above-mentioned configuration and the processes, when a signal conversion unit such as a wireless unit is provided in a demand serial communication system between a demand and a lens apparatus, by selecting necessary data from data to be transmitted and received by the wireless communication and transmitting and receiving the selected data, an lens apparatus can be provided, which maintains the normal demand communication rate without a delay of the demand communication rate and a delay or an interruption of an operation even when the wireless transmission rate is lower than the demand communication rate.

The present invention relates to an image pickup system for a camera in a field of video such as a television broadcasting, a camera apparatus, and a lens system, and more particularly, to a lens system that drives and controls a moving optical member of an optical system in a lens apparatus, such as a focusing member, a zooming member, and a stop, by multiple controllers connected to the lens apparatus as external apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-250414, filed Nov. 16, 2011, which is hereby incorporated by reference herein in its entirety.

What is claimed is:

1. A lens system comprising:
a lens apparatus;
an operating unit for operating the lens apparatus;
an operation-side communication unit connected to the operating unit and configured to perform bidirectional communication to/from the operating unit via a transmission line; and
a lens-side communication unit connected to the lens apparatus and configured to perform bidirectional communication to/from the lens apparatus via a transmission line,
wherein the operation-side communication unit and the lens-side communication unit perform wireless communication to/from each other,
wherein the operation-side communication unit comprises:
a command selecting unit configured to select a command to be transmitted to the lens-side communication unit from commands input from the operating unit; and
an answer interpolating unit configured to generate interpolated answer signals by interpolating answer signals with respect to commands that are not selected by the command selecting unit,
wherein the lens-side communication unit comprises:
an answer selecting unit configured to select an answer signal to be transmitted to the operation-side communication unit from answer signals input from the lens apparatus; and
a command interpolating unit configured to generate interpolated commands by interpolating commands received from the operation-side communication unit.

2. A lens system according to claim 1, wherein:
the command selecting unit is configured to select, with respect to commands that instruct a speed, a part of the commands as the command to be transmitted; and
the answer interpolating unit is configured to interpolate only answer signals that return a speed.

3. A lens system according to claim 2, wherein:
the command interpolating unit is configured to interpolate only commands that instruct a speed; and
the answer selecting unit is configured to select, with respect to the answer signals that return a speed, a part of the answer signals as the answer signal to be transmitted.

4. A lens system according to claim 2, wherein:
the command selecting unit is configured to:

select all commands, with respect to switch commands and focus commands, as the commands to be transmitted; and select a part of commands, with respect to zoom commands and iris commands, as the command to be transmitted; and the answer interpolating unit is configured to interpolate only zoom answer signals and iris answer signals.

5. A lens system according to claim 4, wherein:

the command interpolating unit is configured to interpolate only the zoom commands and the iris commands; and the answer selecting unit is configured to:

select all answer signals, with respect to switch answer signals and focus answer signals, as the answer signals to be transmitted; and select a part of answer signals, with respect to the zoom answer signals and the iris answer signals, as the answer signal to be transmitted.

6. A lens system according to claim 1, wherein:

the answer interpolating unit is configured to generate an answer signal to be replied to the operating unit based on a command input from the operating unit, an elapsed time since the command is input, and information on a state of the lens apparatus before receiving the answer signal replied from the lens-side communication unit; and the operation-side communication unit is configured to output the answer signal to the operating unit.

7. A lens system according to claim 6, wherein when the operation-side communication unit receives the answer signal replied from the lens-side communication unit, the answer interpolating unit is configured to correct a previously generated answer signal based on the received answer signal.

8. An image pickup system comprising the lens system according to claim 1.

9. A lens apparatus unit comprising:

a lens apparatus; and a communication unit connected to the lens apparatus and configured to perform bidirectional communication to/from the lens apparatus via a transmission line, wherein the communication unit performs wireless communication to/from an external operating unit, wherein the communication unit comprises:

an answer selecting unit configured to select an answer signal to be transmitted to the external operating unit from answer signals input from the lens apparatus; and a command interpolating unit configured to generate interpolated commands by interpolating commands received from the external operating unit.

* * * * *